Patented June 22, 1943

2,322,555

UNITED STATES PATENT OFFICE 2,322,555

ADSORBENT AND TREATMENT OF OIL THEREWITH

Charles C. Winding, Ithaca, N. Y., assignor to Tide Water Associated Oil Company, Bayonne, N. J., a corporation of Delaware No Drawing. Application April 23, 1941, Serial No. 389,892

12 Claims. (Cl. 196—147)

This invention relates to adsorbents and methods for the preparation thereof. More particularly, the invention is concerned with the production of a synthetic (as compared with naturally occurring adsorbent earths, clays, or minerals) adsorbent composition comprising predominantly magnesium oxide with which a varying relatively minor proportion of carbon dioxide may be associated in chemical or physical relationship. Adsorbent compositions of the invention are characterized by enhanced decolorizing activity relative to presently available materials for this purpose, and especially provide very substantial improvement in magnesium oxide decolorizing agents. Use of the stated synthetic adsorbent compositions in methods for refining oil is within the scope of the invention.

While general utility is contemplated in the various arts and industries where adsorbent compositions or materials find useful application, the product provided by the present invention has particularly worthwhile usefulness in the refining of petroleum or petroleum fractions in view of its demonstrated activity as a decolorizing agent for oils.

In its more general aspects, the present invention is concerned with the preparation of an active magnesium oxide adsorbent from magnesium carbonates which have a capacity for conversion to positively active adsorbent material upon calcining. The treatment of such source material is effected under critically controlled calcining conditions to produce an adsorbent composition having marked decolorizing activity and comprising predominantly magnesium oxide with which a relatively minor proportion of carbon dioxide usually is associated. The magnesium oxide content of the adsorbent product ordinarily will fall within the range of from about 70% by weight to about 95% by weight; and the associated carbon dioxide is believed to be present at least in part as magnesium carbonate although it is possible that some residual carbon dioxide is adsorbed on a surface of magnesium oxide. It will be understood, however, that no limitation is intended to be inferred or imposed by any theory expressed herein as to the chemical or physical manner in which carbon dioxide may be associated with magnesium oxide in the adsorbent composition provided by the present invention or produced by the method disclosed in this specification.

Magnesium carbonate may be readily prepared by precipitation from solutions of magnesium salts with an available carbonate ion such as is provided by sodium carbonate. Thus, solutions of magnesium chloride or magnesium sulfate may be precipitated to the carbonate by addition of sodium carbonate, potassium carbonate or ammonium carbonate. These and other methods for the preparation of magnesium carbonates are well known to those skilled in the art and are described at length in the literature. Magnesium carbonate also occurs in the natural state as the mineral magnesite which is found in various regions. Such naturally occurring magnesium carbonate as magnesite does not, however, fully satisfy the requirements or respond very effectively to the treatment of the present invention for the preparation of adsorbent compositions having positive or high oil decolorizing activity. Accordingly, in the practical embodiments of the invention, source material for the preparation of markedly improved adsorbents or decolorizing agents comprises a precipitated or other suitable synthetic magnesium carbonate.

The magnesium carbonate from which magnesium oxide adsorbents are prepared may be the normal compound usually designated as $MgCO_3$, basic magnesium carbonate, hydrates of these are a mixture of various forms. All are encompassed herein by the term magnesium carbonate, the important consideration being that the source material selected be, as stated hereinbefore, one having capacity for conversion by calcining to a highly active adsorbent composition. Magnesium carbonates precipitated from different solutions or by different methods will not be exactly equivalent in respect of the decolorizing activity of adsorbents prepared therefrom by the method of the invention, but all suitable magnesium carbonate starting materials are definitely and beneficially responsive to the critically controlled calcining treatment detailed below.

The preparation of highly active decolorizing agents or adsorbent compositions from suitable magnesium carbonates comprises a relatively simple calcining treatment. It must be controlled and the major critical factor is temperature. With this observed, however, the method is readily carried out; and the relative ease and simplicity with which highly active adsorbents may be prepared is a valuable attribute of the invention.

The essence of the method is that the temperature at which a magnesium carbonate is calcined be maintained below a dull red heat but above 300° C. Calcination at temperatures of from about 325° C. upwards but below 450° C. are wholly satisfactory and constitute an overall range which is critical to quite a degree. More than a few degrees outward deviation from either upper or lower limit occasions a marked lowering in the decolorizing power of the adsorbent product.

While the stated range may be regarded as presenting substantially the upper and lower critical limits for temperature control in this method, exploratory practice of the invention demonstrates an optimum and preferred range of 350° C. to 400° C. At 350° C. to 400 C. maximum decolorizing activity characterizes the adsorbent product; however, the overall variation in decolorizing activity of magnesium oxide adsorbents prepared by calcining a suitable magnesium carbonate at any temperature above about 325° C. but below 450° C. (i. e., definitely below a dull red heat) is relatively small. On the other hand, a similar calcining treatment carried at temperature either above or below the overall range is productive of markedly inferior compositions. This is shown very clearly by the illustrative data set forth hereinafter.

Maintaining the calcining temperature within the specified critical range, the calcining time necessary to give a product of maximum decolorizing activity will of course vary with the actual temperature used. As might be expected, the lower temperatures require a longer period of treatment while shorter calcining periods characterize operations at the higher temperatures. As a matter of operating control, the calcining operation is continued to a point of substantially constant weight in the calcined product, or in other words until the loss in weight shown by incremental test samples ceases to change markedly for successive test intervals. Inasmuch as the operation is essentially one of removing carbon dioxide (and water if present) from the magnesium carbonate source material, other factors in addition to the specific operating temperature will affect the necessary time requirements of the process. In all cases the effective or necessary time for calcining treatment is best and readily determined by simple experiment for given materials and operating conditions.

One of these concerns the type of carbonate material undergoing treatment. Both the chemical character and physical structure or character of precipitated magnesium carbonates will to some degree affect the time requirements of a calcining treatment operating to convert the initial carbonate to an active adsorbent comprising predominantly magnesium oxide. When water is present, either as a hydrated magnesium carbonate or in other form, the heat treatment will involve dehydration as well as the removal of carbon dioxide. Again, as indicated hereinbefore, the method by which the magnesium carbonate is precipitated or otherwise synthesized will affect the physical structure or character of the material subjected to calcining treatment; and this in turn will have some influence on the time required to attain the required degree of conversion from an inactive magnesium carbonate to a highly active magnesium oxide adsorbent, as well as affecting in some degree the relative activity of the adsorbent product.

A further factor influencing the time requirements of the process is the degree to which and manner by which the charge in the calcining furnace is agitated during the heat treatment. With efficient agitation or other procedure effective to bring all portions of the charge continually in exposure to available heat at the proper temperature, the time required for the operation will be much shorter than if a static body of charge is being calcined.

Still another time influencing factor is the efficiency of evolved gas (i. e., carbon dioxide and water vapor) removal from the immediate vicinity of the material being calcined. This may be accomplished by such methods as vacuum operation, forced circulation of hot gas over the surface of material in the calcining furnace or oven, or in fact in any effective manner which will continuously remove evolved gas from the active calcining area.

It will be apparent, of course, that the two last mentioned time influencing factors are essentially related to and functions of the apparatus or equipment used to effect the calcining treatment. In view of this circumstance which may vary considerably, and further in view of the character of other mentioned factors affecting the time required for processing magnesium carbonates according to the invention, no definite or precise statement with respect to specific treating time can be made. Uniformly maintained temperature within the specified range is the important and critical point of control. Other factors such as time or duration of calcining treatment can best be and readily are determined and controlled for specific processing operations upon the experience of those practicing the invention and to whom teachings of this specification have been made available.

The effectiveness or activity of adsorbents in refining oils, especially the decolorizing of petroleum lubricating oils, offers a convenient method of evaluating the utility, novelty and general advantages attending the practice of the present invention. Utilizing this property as a criterion, the following information evidences the novel character and special benefits of adsorbent compositions and their preparation according to the invention herein described and claimed.

The oil used for test purposes was an undewaxed Pennsylvania cylinder stock of 26.1 gravity, 50° F. pour point, 550° F. flash (closed cup) and 147 seconds Saybolt viscosity at 210° F. Color determinations were made by the optical density (O. D.) method of Ferris and McIlvain (Industrial & Engineering Chemistry, Analytical edition 6, 23 (1934)). Directions as given in the reference mentioned were followed exactly except that a Bausch and Lomb monochromatic green filter was used as a source of monochromatic light. By this method, the initial color of the test oil prior to any decolorizing treatment was 2650 O. D. Lower O. D. numbers represent improvement in color.

In the test, a measured quantity of oil as aforesaid was agitated in a substantially closed vessel for a predetermined period of time in contact with a measured quantity of adsorbent or decolorizing material at a set temperature. The optical density of the treated oil then was compared with that of the original stock in order to obtain a measure of the value or effectiveness of the decolorizing agent. The data set forth below were obtained with test conditions standardized at 300 grams of cylinder stock, 40 grams of adsorbent or decolorizing agent, treating temperature of 400° F. and treating time of 20 minutes. Under these treating conditions and for purposes of the test in question, a treated oil sample having a color corresponding to 1250 O. D. was evidence of very, very slight decolorizing power or activity in the adsorbent agent; while a positively or highly active agent would improve the oil to the extent represented by a change from initial 2650 O. D. to treated oil O. D. of about 300 to about 500.

An adsorption composition according to the invention was prepared from a commercial magnesium carbonate of high purity, prepared by precipitation from a magnesium salt solution, and showing upon analysis approximately 86% by weight of $MgCO_3$ and the remainder mainly water. Adsorbent compositions were prepared from different samples or portions of one lot of this magnesium carbonate source material, the calcining temperature being varied from sample to sample and in each case treatment being continued to a point of either substantially constant weight, or, in the case of lower temperature runs, sometimes to a point where continued change in weight of the material undergoing treatment was at very greatly reduced rate. The decolorizing activity of various adsorbent compositions thus prepared was compared by the test method described above.

Adsorbent compositions prepared in the foregoing operations at calcining temperatures ranging from 325° C. to 440° C. exhibited decolorizing power represented by treated test oil colors corresponding to O. D. values within the range of 335 to 475. It will be recalled that the oil had an initial O. D. of 2650, these results therefore showing very active decolorizing power. When the calcining temperature was reduced below 325° C. the change in effectiveness of the calcined product was marked to quite a degree. Prepared at 300° C., for example, the calcined product when tested gave a treated oil color corresponding to an optical density of 1000; whereas in the case of an adsorbent composition prepared from the same batch of magnesium carbonate source material at a temperature of 325° C., very active decolorizing power was shown by a treated test oil O. D. of 475. At the upper end of the specified temperature range, like contrast was observed. Adsorbent composition prepared at 440° C. reduced the O. D. of the test oil from initial of 2650 to a treated value of 450. When the adsorbent was prepared at a calcining temperature of 500° C. the treated test oil showed O. D. values as high as 740. Within the specified critical range of 325° C. to about 450° C., it was observed that best results were obtained in the 350° C. to 400° C. bracket but the overall variation throughout the broader range is small, as the foregoing illustrative test results clearly demonstrate. When the calcining temperature lies outside this range very material change to an inferior adsorbent composition is observed immediately.

The critical nature of the specified calcining temperature range was confirmed in extensive exploratory investigation of various magnesium carbonate source materials. In all cases magnesium oxide adsorbent compositions having greatly enhanced decolorizing activity are obtained when the carbonate source material is treated by calcining to substantially constant weight at temperatures above 300° C. and below 450° C.; the same materials calcined at temperature outside this range being much less active. As pointed out earlier herein, not all magnesium carbonates give adsorbent compositions having the same degree of decolorizing power. However, any given carbonate source material is similarly responsive to the critical treatment prescribed by the present invention. In fact even the naturally occurring mineral magnesite, which develops relatively little adsorbent or decolorizing activity at any temperature of calcining treatment, is productive of relatively more active decolorizing power when calcined at temperatures within the range of 325° C. to below 450° C. than when the calcining treatment is conducted at temperatures above or below this range.

In using the adsorbent composition described hereinabove in the decolorization of oils by contact filtration according to this invention, the oil to be decolorized, which may be a petroleum lubricating oil stock, is mixed with the desired quantity of finely divided magnesium oxide adsorbent and the mixture of oil and adsorbent is agitated at elevated temperature. The treatment temperature depends to some extent upon the results desired. Temperatures of about 400° F. give best results when treating viscous lubricating oils of the type described hereinabove. The mixture is then filtered on a pre-coat filter. The on-color stock requires no stripping with steam as is necessary in similar methods employing other contact adsorbents. The spent adsorbent is then washed by mixing with naphtha or the like and steaming. If desired, and in order to facilitate a continuous process, a suitable amount of the spent adsorbent may be bled off after the washing operation and replaced with fresh material. However, it is preferred to bleed off and replace with fresh adsorbent after revivifying the spent adsorbent.

The adsorbent is advantageously revivified by heating the same to a temperature sufficiently high to restore as much as possible of its activity without deleteriously affecting its other desirable properties. In general satisfactory revivification may be accomplished by heating under conditions similar to those employed in calcining the magnesium carbonate in producing the original magnesium oxide adsorbent as described hereinabove. In general best results are obtained using temperatures of from about 380° C. to about 430° C. in this reburning operation.

Regarding the adsorbent which is bled off as stated hereinabove, this material may be readily and economically recovered for use in the process. To this end this bled-off magnesium oxide composition may be converted to magnesium sulfate and the latter employed in the precipitation of magnesium carbonate which by subsequent calcination as above described produces the active magnesium oxide adsorbent.

In addition to the high degree of decolorization obtained the method of this invention results in less cracking or other undesirable changes in the oil, and the treated oil is of better cast than is the case where certain other proposed adsorbents are used.

While the oil decolorizing power of the described magnesium oxide adsorbents has been particularly stressed herein, it should be understood that the invention embraces within its scope any oil refining process or operation employing the described adsorbents in which the oil is improved by treatment with these active materials.

This case is a continuation-in-part of my copending application Serial No. 253,051, filed January 27, 1939.

I claim:

1. An oil-refining agent comprising a composition of matter formed by calcining a magnesium carbonate at a temperature below 450° C. but above 300° C.

2. An oil-refining agent comprising magnesium oxide formed by calcining a magnesium carbonate at a temperature within the range of from about 325° C. to about 440° C.

3. A composition of matter for use as an adsorbent having high oil decolorizing activity and comprising magnesium oxide formed by calcining a magnesium carbonate at a temperature within the range of from about 350° C. to about 400° C.

4. An oil decolorizing agent comprising magnesium oxide formed by calcining a magnesium carbonate to substantially constant weight at a temperature above 300° C. but below 450° C.

5. A process for refining oil comprising treating said oil with an active magnesium oxide composition prepared by calcining magnesium carbonate at a temperature above 300° C. but below a dull red heat.

6. A process for refining oil comprising treating said oil with an active magnesium oxide composition prepared by controlled calcination of a magnesium carbonate at a temperature above 300° C. but below 450° C.

7. A process for refining oil comprising treating said oil with an active magnesium oxide composition prepared by controlled calcination of a magnesium carbonate at a temperature within the range of from about 325° C. to about 440° C.

8. In the decolorization of lubricating oil, the method comprising agitating said oil with a finely divided magnesium oxide decolorizing agent produced by controlled calcination of a magnesium carbonate at a temperature above 300° C. but below a dull red heat.

9. In the decolorization of petroleum lubricating oil, the method comprising agitating said oil at an elevated temperature with a finely divided magnesium oxide composition produced by controlled calcination at a temperature above 300° C. but below 450° C. of a magnesium carbonate capable of being converted to an active material upon said calcination and separating decolorized oil from the spent magnesium oxide composition.

10. Method for decolorizing mineral lubricating oil comprising agitating said oil at an elevated temperature with an active magnesium oxide decolorizing composition prepared by calcining a magnesium carbonate at a temperature above 300° C. but below 450° C., removing decolorized oil from the spent adsorbent, and revivifying the spent adsorbent for reuse in the process by heating the same at a temperature between about 380° C. and about 430° C.

11. In the decolorization of viscous mineral lubricating oils by the method of contact filtration, the step comprising agitating said oil with an active magnesium oxide composition at a temperature of about 400° F., said composition having been prepared by controlled calcination at a temperature within the range of from about 325° C. to about 440° C. of a magnesium carbonate capable of being converted to an active material upon said calcination.

12. A method for preparing an active magnesium oxide adsorbent composition which comprises calcining a magnesium carbonate at a temperature above 300° C. but below 450° C.

CHARLES C. WINDING.